United States Patent [19]

Navarro

[11] 4,228,360
[45] Oct. 14, 1980

[54] WAVE MOTION APPARATUS

[76] Inventor: Pablo Navarro, 2110 Magnolia Ave., Sanford, Fla. 32771

[21] Appl. No.: 46,713

[22] Filed: Jun. 8, 1979

[51] Int. Cl.³ .............................................. F03B 13/12
[52] U.S. Cl. ........................................ 290/43; 290/53
[58] Field of Search ...................... 290/42, 43, 44, 45, 290/53, 54, 55

[56] References Cited

U.S. PATENT DOCUMENTS

| | | | |
|---|---|---|---|
| 3,894,241 | 7/1975 | Kaplan | 290/53 X |
| 3,959,663 | 5/1976 | Rusby | 290/53 |
| 3,964,264 | 6/1976 | Tornabene | 290/53 X |
| 4,145,885 | 3/1979 | Sollel | 290/53 X |

Primary Examiner—B. Dobeck
Attorney, Agent, or Firm—Duckworth, Hobby & Allen

[57] ABSTRACT

Apparatus for producing useful work from wave motion in a body of water. The apparatus translates wave motions of varying periods to continuous rotational kinetic energy which is then available to perform useful work. A float assembly is anchored off shore and communicates with the shore via a steel cable. The float rises and falls with the waves and is arranged to cause a reciprocating translational motion of the cable. A cable drum assembly is anchored to the ground on the shore and adapted to reel and unreel the cable by means of a rewind spring. As the cable unreels, the drum drives a transfer gear via a first ratchet which is therefore operative only in one direction. The transfer gear winds a heavy spiral energy storage spring via a second ratchet. The spring is attached to an anchor plate which drives a shaft. The shaft is coupled via a step-up gear train to an energy storage flywheel. The flywheel may be coupled to an electrical generating system or the like for utilizing the energy stored in the flywheel.

9 Claims, 11 Drawing Figures

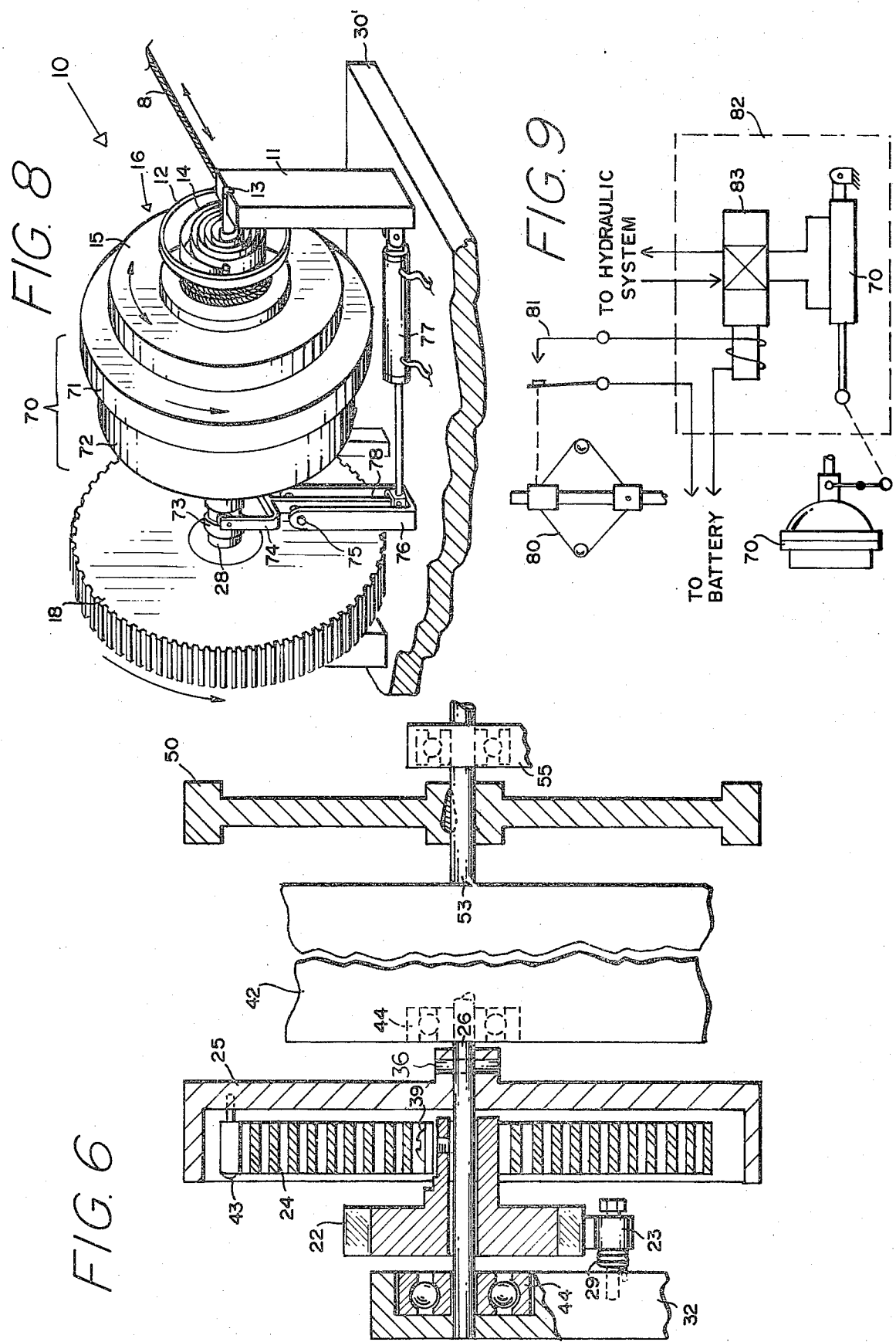

WAVE MOTION APPARATUS

BACKGROUND OF THE INVENTION

1. Field of the Invention

The present invention relates to apparatus for producing useful work from wave motion in a body of water, and more specifically, for converting wave motions of varying periods to continuous kinetic rotational energy.

2. Description of the Prior Art

Waves in large bodies of water, for example in the oceans, extract momentum from the winds in the planetary boundary layer and store energy in the form of kinetic and potential energy. The energy and power in ocean wind waves can be quite considerable. It has been calculated that waves in an average sea having an approximate 1.5 meter wave height occurring with a period of eight seconds will produce a mean flux of wave power across a section of the ocean of about ten kilowatts per meter. These waves vary in several ways. The waves experience short term fluctuations of period and wave length, and height varies with conditions. The long term variations depend primarily on location. There have been many different methods and apparatus developed over the years in an attempt to extract the energy from the wave motion and to convert it into either mechanical or electrical power. Many of these attempts have utilized the pressure head represented by the wave heights. These schemes using pressure chambers, bellows, floats and the like which attempt to directly convert the wave head to usable work have proven relatively ineffective because of the low mean ocean wave heights. Other devices have used seesaw type floats which are dependent on the period of the wave and therefore represent narrow band pass filters which are efficient only at one frequency.

To be efficient, a wave powered machine must be able to extract the energy from the relatively low water head associated with wave height, and it must have a very broad band response for both amplitude and frequency of the waves since these parameters vary widely.

SUMMARY OF THE INVENTION

The present invention meets the criteria for an effective apparatus for producing useful work from wave motion in the ocean or other large bodies of water and is relatively insenitive to period and amplitude of the waves. The invention consists of three major elements. The first element is a cable assembly comprising a float system anchored offshore and adapted to be responsive to the motion of the waves. The float assembly can take many physical forms; however, a simple, effective type in accordance with the invention uses a base anchored to the ocean floor and having a pulley attached thereto. A steel cable is run from the shore to the float assembly in an approximately horizontal line with the cable feeding through the pulley and being attached to a large float. The float, which may be of conventional design, will rise to the surface of the water holding the portion of the cable between the float and the pulley essentially vertical.

The remainder of the cable assembly is located on the shore and securely anchored to the ground. A cable drum or reel is provided in the assembly with the shore end of the cable attached to the drum. Sufficient turns of the cable are provided on the drum to accommodate the expected wave height and variations in the mean water depth due to tides. The cable drum includes a cable rewind spring which maintains the cable taut out to the float assembly. As may now be recognized, as the float rises with the motion of the waves, the cable will be unwound from the drum and moved seaward, tightening the rewind spring. Then as the float drops, the cable drum will wind the cable onto the drum by means of the rewind spring.

Thus, in response to the wave motion and the rise and fall of the float, the cable will reciprocate between a seaward and a shoreward movement, rotating the cable drum in forward and reverse directions. The cable drum is coupled to a transfer gear by means of a ratchet drive. The ratchet drive is arranged such that the transfer gear is caused to rotate when the cable motion is seaward and the cable drum rotates in the forward direction and to not rotate when the cable motion is shoreward as the cable is being rewound on the drum in the reverse direction. The transfer gear is utilized to periodically transfer wave energy from the cable assembly to an energy storage assembly which represents the second element of the invention.

The energy storage element utilizes a large spiral spring as the energy storage device. The energy storage spring is mounted on a spring anchor plate having an output drive shaft attached thereto. The center of the spring is attached to a transfer pinion geat concentric with the output drive shaft. The transfer pinion gear is arranged to engage the transfer gear from the cable assembly, and also includes a ratchet pawl such that the transfer pinion gear can be rotated in one direction only. In accordance with the invention, when the transfer gear rotates in response to the cable drum forward rotation as the cable moves seaward, the transfer pinion gear is rotated in a forward direction so as to wind the energy storage spring.

The output drive shaft is coupled to a step-up gear assembly which forms part of the third element of the invention, the output drive assembly. The amount of step-up gearing is a design variable in the invention and may typically be on the order of 40 to 1. The output of the step-up gear drives a large fly wheel having a coupling means for extracting the energy which will ultimately be stored in the flywheel. As the energy storage spring unwinds, thereby driving the flywheel through the spring anchor plate and step-up gearing, its energy is transferred from torsional potential energy in the spring to rotational kinetic energy in the flywheel. The high inertia of the flywheel and step-up gearing is such that for expected wave periods energy will be stored in the energy storage spring during the rise of the waves and can be continuously extracted from the flywheel during both rise and fall of the waves.

It will be noted that no energy is being transferred to the energy storage spring during the falling portion of the wave period. Thus, the energy is stored during an approximate 50 percent duty cycle. As long as the useful work being performed by the output of the invention over a full wave period does not require energy in excess of that stored during the wave rise portion of the period, a smooth constant delivery of work is thus obtained. As may now be recognized, the apparatus is insensitive to the actual wave periods and to variations in wave amplitudes, as long as the average available power output is not exceeded.

The apparatus may conveniently drive an electrical generator for producing easily utilized energy. For installations in which the hourly and daily wave amplitude variations are small, an AC generator may be used to directly power desired loads. In locations having widely varying wave conditions, a DC generating system may be used to advantage, having a bank of storage batteries which can store excess energy during periods of high wave amplitudes and release such long term stored energy during periods of low amplitudes. The availability of efficient inverters to produce AC power make such a system attractive.

After the wave motion machine of the present invention is in operation, the energy storage spring will tend to unwind continuously as power is utilized from the machine output and will tend to wind during the transfer period when the wave is rising. Thus, the spring anchor plate and its output drive shaft will continuously rotate to drive the flywheel through the gear step-up unit. Where a more or less constant and minimum load is maintained on the output of the apparatus, there is no problem with overwinding of the energy storage spring. However, where intermittent or low loads are present, the spring may completely wound and additional wave energy would then be added to the flywheel, causing its rotational speed to become excessive. For installations in which this problem can occur, a novel governor and clutch arrangement may be used. Accordingly, a clutch is installed between the cable drum and the transfer gear. In normal operation, this clutch is engaged and the drum will rotate the transfer gear via the ratchet assembly. A governor is coupled to the flywheel shaft output and arranged to sense excessive flywheel speed which would be indicative of insufficient load. When such condition is sensed, a clutch control operates to disengage the clutch, allowing the cable drum to operate freely without turning the transfer gear.

During this condition, the energy storage spring will tend to unwind driving the flywheel until its speed decreases causing the clutch to re-engage. This cycle will be repeated until full load on the apparatus is resumed.

It is, therefore, a principal object of the invention to provide apparatus for producing useful work from wave motion in a body of water.

It is another object of the invention to provide means for periodically transferring the energy from such wave motion to continuous kinetic rotational energy available for producing useful work.

It is still another object of the invention to provide apparatus having a float assembly for anchoring offshore which will translate wave motion to reciprocating motion of a cable communicating with the shore.

It is still another object of the invention to provide apparatus having a shore-based portion for transferring energy in a reciprocating cable into energy stored in a spring.

It is a further object of the invention to transfer wave motion energy stored in a spring into kinetic rotational energy stored in a flywheel.

It is still a further object of the invention to provide apparatus for producing useful work from wave motion in a body of water in which such production is relatively independent of the period of the waves.

It is still a further object of the invention to provide apparatus for producing useful work from wave motion in a body of water in which such production is relatively insensitive to variations in the amplitudes of the waves.

It is another object of the invention to provide apparatus for producing useful work from wave motion in a body of water which is not primarily dependent upon the wave head for its operation.

It is still another object of the invention to provide apparatus for storing energy from wave motion which is adapted to operate electrical generation systems.

These and other objects and advantages of the invention will become apparent from the following detailed description of a preferred embodiment of the invention and with reference to the accompanying drawings.

BRIEF DESCRIPTION OF THE DRAWINGS

FIG. 6 is a cross-sectional view of the energy storage spring section of the embodiment of FIG. 3;

FIG. 8 is a perspective view of an alternative embodiment of the cable section of the invention having a clutch assembly; and FIG. 9 is a functional block diagram of the control system for the clutch assembly of FIG. 8.

DETAILED DESCRIPTION OF THE PREFERRED EMBODIMENT

Figure 1:
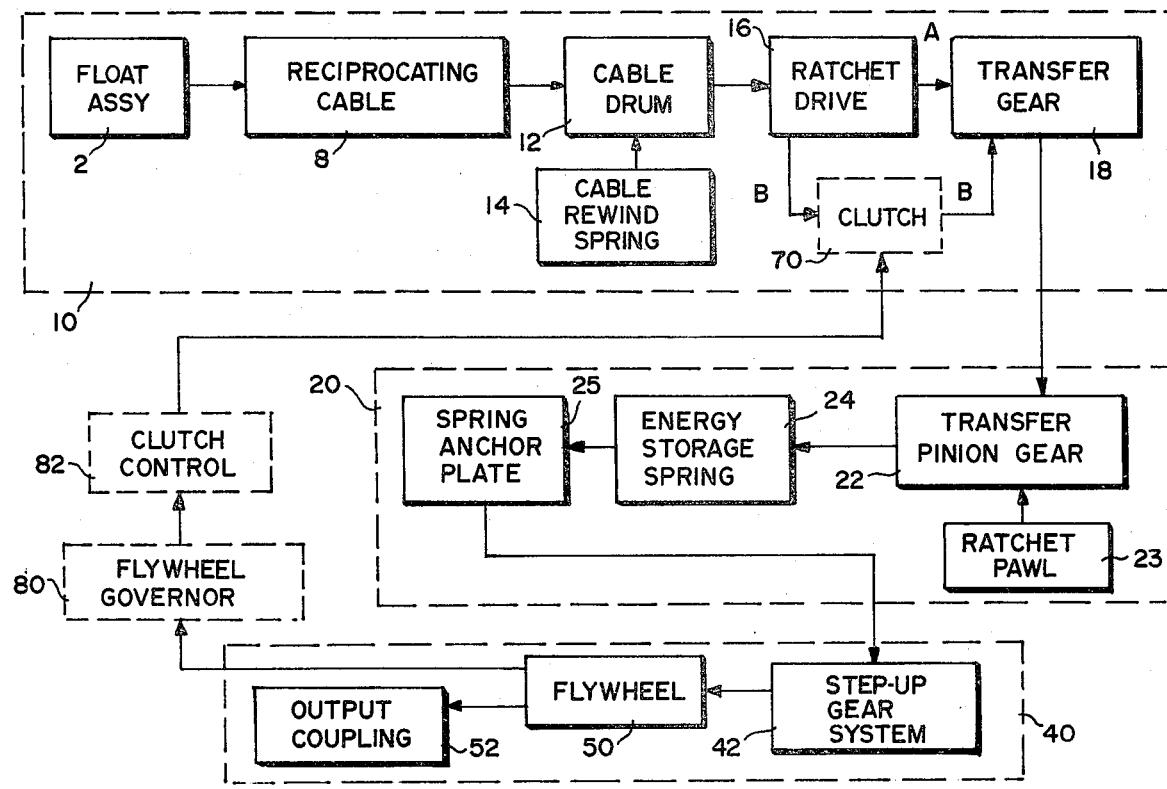
FIG. 1 is a functional flow diagram of the invention showing the interrelationships of the various elements thereof.

The invention involves apparatus for absorbing energy from wave motion in a large body of water such as an ocean. The kinetic and potential energy stored in the waves from the action of wind, tides and sun are first converted to translational motion of a cable as shown in the functional flow block diagram of FIG. 1. This first energy transfer occurs in the cable handling section 10 which utilizes a float assembly 2 anchored offshore. The function of the float assembly 2 is to translate the up and down motion of the waves into a reciprocating motion of a cable 8 communicating from the float assembly to the shore. On the shore the cable handling element is anchored to the ground and consists of a cable drum 12 and transfer gear 18. The cable drum 12 includes a cable rewind spring 14 with the cable 8 attached to drum 12 such that when the motion of the cable 8 is away from the shore the cable rewind spring 14 is wound. Then when the motion of the cable 8 is towards the shore, the cable rewind spring 14 rewinds the cable upon the drum 12. Sufficient extra cable may be stored on cable drum 12 to accommodate variations in wave amplitudes and in tidal variations of the average height of the water. As the cable drum 12 unwinds and rewinds responsive to the reciprocating motion of cable 8, it drives a transfer gear 18 via ratchet drive 16 as shown by flow arrow A with ratchet drive 16 arranged to cause cable drum 12 to turn transfer gear 18 only when cable 8 is moving away from the shore such that the transfer gear 8 is not rotated during the rewinding portion of the cycle. Thus, transfer gear 18 is rotated in one direction only. In an alternative embodiment, clutch 70 is connected between ratchet drive 16 and transfer gear 18 as shown by flow arrows B to disengage transfer gear 18 under certain conditions to be described below.

The energy input to transfer gear 18 as the cable unwinds from drum 12 is transferred to the energy storage element 20 of the invention by means of transfer pinion gear 22 meshed with transfer gear 18 having a ratchet pawl 23 associated therewith. The ratchet pawl 23 allows transfer pinion gear 22 to rotate only in the direction driven by transfer gear 18. Transfer pinion gear 22 is coupled to energy storage spring 24 which may be a large, heavy-duty spiral spring. Energy storage spring 24 may have its inner anchor attached to transfer pinion gear 22 and its outer anchor attached to spring anchor plate 25. When the float system is engaged causing rotation of transfer gear 18, transfer pinion gear 22 winds energy storage spring 24. The ratchet pawl 23 associated with transfer pinion gear 22 prevents unwinding of spring 24 during the cable rewind portion of the wave cycle. The winding of spring 24 thus stores the energy transferred from the wave motion into torsional potential energy. The output shaft from spring anchor plate 25 is operatively connected to output section 40 of the invention which comprises a step-up gear system 42, flywheel 50 and output coupling 52. Flywheel 50 is selected to store the maximum energy capability of energy storage spring 24 as rotational kinetic energy at a desired rpm. The step-up gear system 35 drives flywheel 50 to the desired rpm from the rotation of the spring anchor plate 25 shaft as the energy storage spring 24 begins to unwind. After flywheel 50 has come up to an equilibrium speed of rotation, energy may be drawn from the system via output coupling 52. Any desired type of coupling may be used to provide energy for useful work with a common method being to utilize an electrical generator for driving any desired electrical apparatus.

In the alternative embodiment of the invention, a governor 80 is coupled to flywheel 50. If flywheel 50 tends to overspeed, as may occur if little or no power is being drawn from the apparatus, governor 80 will cause clutch control 82 to release clutch 70, disconnecting transfer gear 18 from ratchet drive 16. As the stored energy in spring 24 and flywheel 50 is then used and flywheel 50 speed drops to normal, the clutch 70 will re-engage.

As may now be understood, as energy is drawn from flywheel 50 to perform the desired useful work, the energy extracted therefrom during one wave cycle is restored to the flywheel 50 during the cable drum unwind portion of the next cycle. Therefore, a relatively continuous supply of power is available from flywheel 50 and is relatively independent of the period or amplitude of the actual wave motion, as long as the system is not overloaded.

Figure 2:
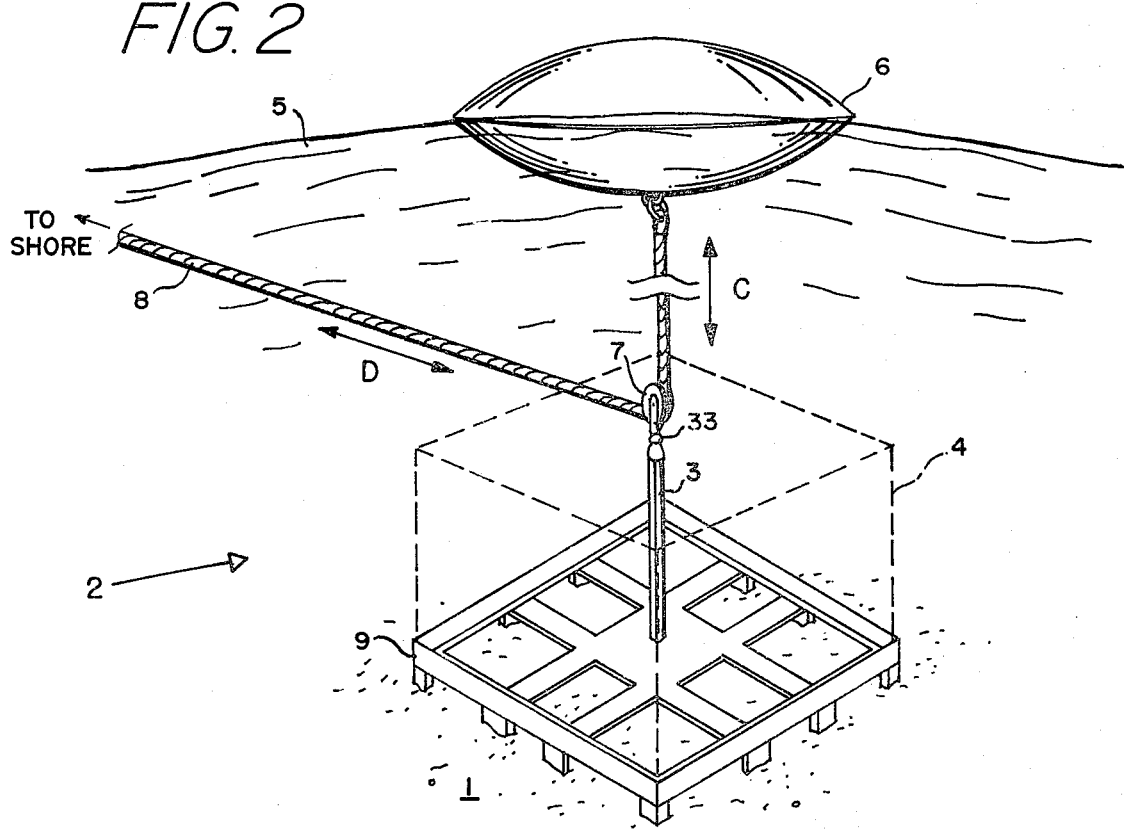
FIG. 2 is a perspective view of a typical float assembly in accordance with the invention.

Turning now to the preferred implementation of the invention, FIGS. 2, 3, 4, 5, 6 and 7 illustrate the configuration of a typical embodiment. Referring first to FIG. 2, one version of a float assembly is illustrated. Float assembly 2 herein illustrated is of a transportable nature to suit one application for the invention such as providing power on a temporary basis in a seaside location remote from commercial power. Here, a steel framework 9 is provided having a post 3 centrally located thereon. The base of framework 9 is adapted to hold an anchoring weight such as concrete blocks or the like as indicated in phantom view 4. This construction allows the float assembly 2 to be quickly installed and removed for transport to other locations. A pulley 7 is mounted at the upper end of post 3 via a universal or ball joint 33 and accepts cable 8 which is attached to a float 6. The size of float 6 is selected on the basis of the maximum power desired from the invention and the expected wave amplitudes. Waves 5 will cause float 6 to rise and fall, moving the vertical portion of cable 8 up and down as shown by arrows C. This motion is then translated by pulley 7 to reciprocating motion, indicated by arrows D, of cable 8 which communicates with the shore. For a permanent installation, pulley 7 would be attached to a piling of other permanent structure attached to ocean floor 1. Joint 33 allows for horizontal excursions of float 6 without jamming of pulley 7.

Figure 3:
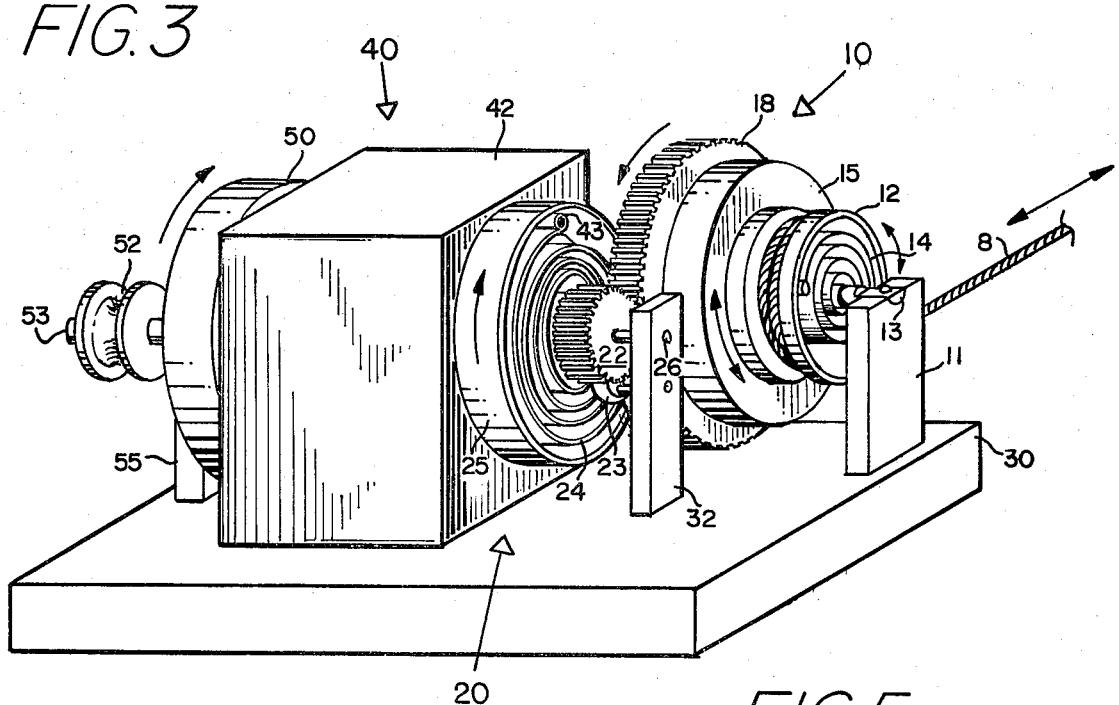
FIG. 3 is a perspective view of an exemplary embodiment of the energy transfer section of the invention.
Figure 4:
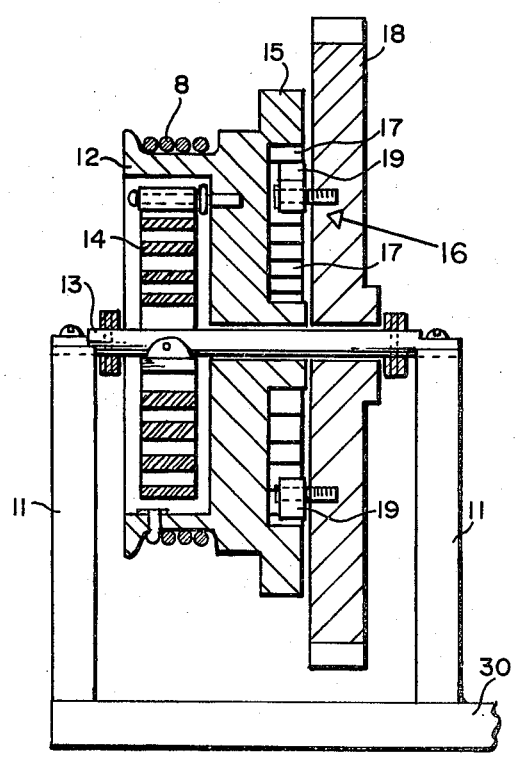
FIG. 4 is a cross-sectional view of the cable and transfer gear portion of the embodiment of FIG. 3.
Figure 5:
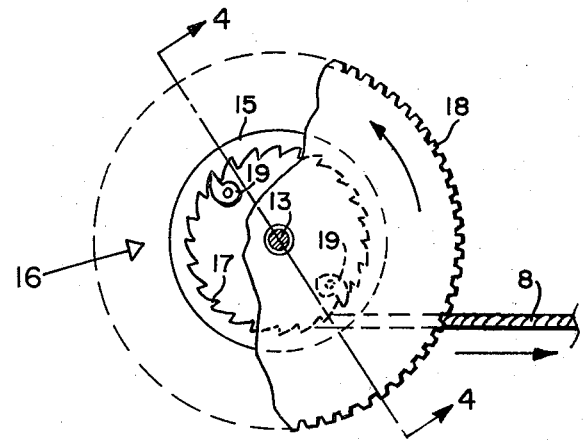
FIG. 5 is a partially cut away view of the transfer gear of FIG. 4 showing details of the ratchet drive mechanism.

In FIG. 3 a perspective view of one embodiment of the invention is shown which discloses the major external elements of this portion of the apparatus. A base plate 30 is provided for convenient mounting of the other elements and which will be anchored to the ground on the shore when un use. A fixed shaft 13, as also seen in FIG. 4, is mounted on supports 11. Cable drum 12 is arranged to freely rotate on fixed shaft 13. Cable 8 from the float assembly is fastened at its shore end to cable drum 12. The capacity of cable drum 12 is based on the expected amount of cable required to be stored thereon. Cable rewind spring 14 has its inner end attached to fixed shaft 13 and its outer end attached to cable drum 12 as may be noted from the cross-sectional view of this portion of the invention in FIG. 4. As the cable 8 moves seaward away from the shore, it unwinds from drum 12 and tightens spring 14. During the fall of the wave, the float allows cable 8 to move shoreward under the force of spring 14 which then rewinds the cable onto drum 12. This cycle of operation is, therefore, repeated with each rise and fall of the waves in the vicinity of float 6. As cable 8 moves outward during the rise of the waves, cable drum 12 rotates counterclockwise as viewed from the right end of the inplementation of FIG. 3. Cable drum 12 includes ratchet drive housing 15 having ratchet teeth 17 around the periphery of its inner surface which may be best seen from FIGS. 4 and 5. Transfer gear 18 also rotates freely on fixed shaft 13. Gear 18 includes a pair of spring loaded pawls 19 attached thereto which engage ratchet teeth 17 in ratchet housing 15. thus, as ratchet housing 15 is rotated counterclockwise in response to an outward movement of cable 8, transfer gear 18 is rotated. On the rewind portion of the wave cycle, pawls 19 slip and transfer gear 18 remains stationary. Thus, at this point, the wave motion has been translated to an intermittent one-directional rotation of gear 18.

Next, in FIG. 3, the energy storage assembly 20 is mounted by means of support post 32 on base 30, one end of gear box 42, and shaft 26. Transfer pinion gear 22 may be noted engaged with transfer hear 18 in FIG. 3 as seen in FIG. 6, which is a partial cross-sectional view of energy storage assembly 20 and output section 40, pinion gear 22 is free to rotate on shaft 26. A ratchet pawl 23, biased by spring 29, engages the teeth of pinion gear 22 to prevent rotation of gear 22 except in a clockwise direction as viewed from the right hand end of the assembly of FIG. 3. Energy storage spring 24, which may be a flat spiral-type spring, has its inner end anchored to the hub of pinion gear 22 as indicated by anchor screw 39. The outer end of spring 24 is anchored by pin 43 to anchor plate 25 which is pinned to shaft 26 by taper pin 36. Anchor plate 25, thus, rotates its output shaft 26 as spring 24 unwinds, driving step-up gear assembly 42.

Gear box 42 of FIG. 3 contains a set of conventional step-up gears driven by shaft 26. The step-up ratio required is again a function of the maximum and average powers desired, the desired rotational speeds or flywheel 50 and similar design parameters. In an experimental model of the invention, a step-up ratio of 1 to 40 was found to be effective. The gearing arrangement is conventional and well-known and is not shown in detail here. The output of gear box 42 is connected to flywheel 50 via shaft 53 which also may be utilized to couple the output of the apparatus to a desired load. Shaft 53 is supported in bearings 44 in gear housing 42 and support post 55 as shown in FIG. 6. As may be understood from FIG. 6, when spring 24 is fully wound and anchor plate 25 rotates, the unwinding action of the spring 24 will cause shaft 26 to rotate driving the step-up gear system 42. Flywheel 50 will be caused to rotate thereby storing the energy from spring 24 into rotational kinetic energy in flywheel 50. As previously mentioned, when a load within the capability of the apparatus is coupled to flywheel 50, the energy transferred by spring 24 during the rewind portion of the wave cycle of cable drum 12 will be replaced in spring 24 during the unwind portion of the cycle and transferred to flywheel 52 and partly during the winding of spring 24 and partly during unwinding. Thus, the novel winding technique with temporary energy storage in spring 24 and essentially continuous rotation of flywheel 50 with energy stored therein converts the intermittent wave-produced energy to a smooth flow of mechanical energy.

Figure 7:
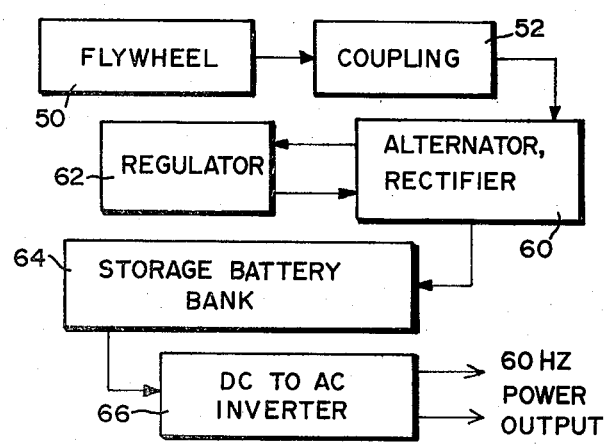
FIG. 7 is a functional block diagram of a preferred method of utilizing the energy output from the invention.

Having now disclosed the apparatus for converting the wave motions of varying amplitudes and periods into a relatively continuous storage of rotational kinetic energy, a preferred method of producing useful work from such stored energy will be discussed with reference to FIG. 7. Shown in block diagram form is a preferred power system in accordance with the invention. Flywheel 50 is coupled to alternator and rectifier 60 for producing a DC charging voltage. A storage battery bank 64 is provided and is maintained on constant charge from alternator 60 and charging regulator 62. Storage battery bank 64 is utilized to operate DC to AC inverter 66 producing for example 60 Hz power output at any desired voltage. The storage battery bank 66 in combination with charging system 60 and 62 represent in effect a further conversion of the kinetic energy in flywheel 50 to electrochemical energy available from the batteries, and has the significant advantage of maintaining a more or less constant load on the mechanical assembly. Furthermore, the energy available during off-load times may be collected and stored for later use by means of the illustrated system.

An alternative embodiment of the invention previously discussed with reference to FIG. 1 is particularly suited to installations which may not have constant or minimum loads. The major modification is shown in FIG. 8 in which a conventional clutch assembly 70 is installed between ratchet housing 15 and transfer gear 18 and utilizing the clutch control system shown in functional blade diagram form in FIG. 9. Clutch plate 71 carries pawls 19 of FIG. 5; thus, rotation of cable drum 12 in the forward direction will result in rotation of clutch plate 71 in the forward direction with ratchet drive 16 preventing rotation in the opposite direction. Clutch disc housing 72 contains conventional and well-known pressure plates having friction material, and clutch release and engage mechanisms as is well known in the art. Shaft 28 is driven from the clutch discs and causes transfer gear 18 to rotate in the forward direction as plate 71 rotates and clutch 70 is engaged. Any conventional means for operating clutch 70 may be used. For illustration purposes, throw out sleeve 73 may be operated by yoke 74 supported by pivot 74 in bracket 76. Hydraulic actuator 77 is anchored to support post 11 and operatively connected to yoke arm 78. Contraction of actuator 77 causes clutch 70 to release and extension causes clutch 70 to engage. A conventional governor assembly 80, as shown functionally in FIG. 1, is attached to the output of flywheel 50. Referring to FIG. 9, clutch control 82, for the example of FIG. 8, may be a solenoid hydraulic valve 83 operated by electrical contacts 81 on governor 80, and supplying hydraulic pressure to actuator 77. Although the hydraulic system is not considered as a part of the invention, the system may include an accumulator for maintaining and supplying hydraulic pressure, and a hydraulic pump for charging the accumulator. The pump may be arranged to be driven by the apparatus of the invention during low load periods, thereby making efficient use of the available energy.

Figure 10:
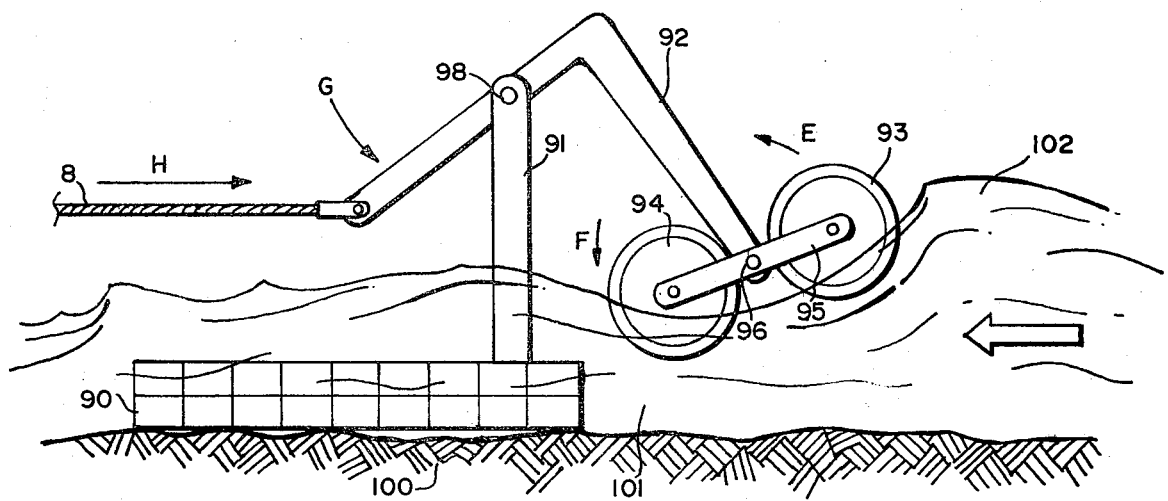
FIG. 10 is a view of a float assembly suitable for use with shore type waves.
Figure 11:
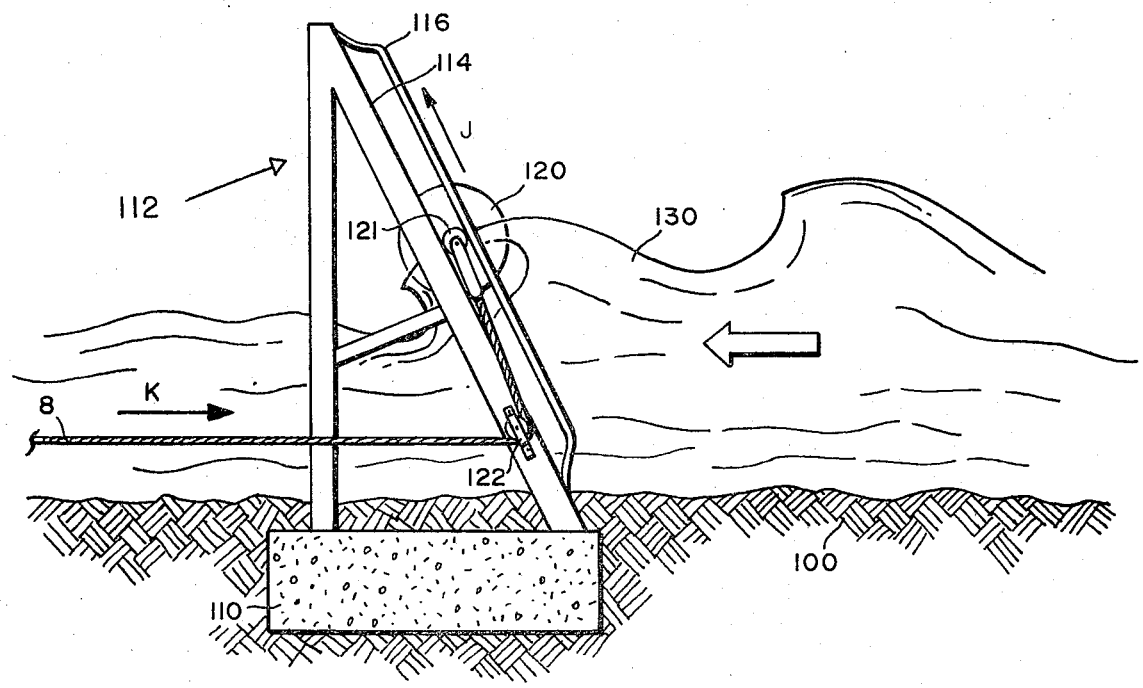
FIG. 11 is a view of a float assembly suitable for permanent shore line installation.

As will be evident, many other forms of clutches and controls may be utilized, such as electromagnetic clutches, hydraulic clutches and the like. When an alternator is used to provide electrical power, well-known circuits may monitor the alternator frequency as an indication of flywheel speed, or may monitor the unregulated voltage output as a measure of load conditions. In the preferred embodiment of the invention it is contemplated that the float section will be anchored off shore in a region having predominantly vertical wave motion. Thus, the float system disclosed in FIG. 2 is eminently suited for translating the vertical wave motion to a reciprocating motion of cable A. However, alternative embodiments of the float section shown in FIG. 2, may be used with the invention to utilize shore breaking waves, especially in regions where large tidal variations are not present. FIGS. 10 and 11 are simplified drawings showing two alternative float assemblies suitable for use with shore type waves. In FIG. 10, a weighted frame work 90 is shown anchored in shallow water near the beach line. Various types of weights such as concrete or stones may be used here to anchor the frame to the bottom surface 100 shown in cross section. Alternatively, pilings or the like may be used to secure the float assembly to the bottom. Post 91 supports lever arm 92 which may have an L-shape and rotate about pivot 98. At the seaward end of arm 92, a double float assembly is mounted. A float mounting arm 95 is pivoted at the distal end of lever 92 by pivot 96. As a shore wave or breaker 102 approaches the shore in the direction as shown by the open faced arrow, such wave is normally preceded by a trough 101. The wave strikes float 93 tending to lift float 93 as shown by arrow E which then pivots about pivot 96 causing float 94 to be engaged in the trough 101 as shown by arrow E. As wave 102 continues inward, it lifts both floats 93 and 94 upward causing the opposite distal end of lever 92 to move inward as shown by arrow G moving cable 8 seaward as shown by arrow H. The articulated double float assembly of floats 93 and 94 provides a more efficient action due to the capability of the floats to move as shown by arrows E and F in response to the changing profile of the surf or breakers approaching the shore. While drum shaped floats are shown here, other shapes may be used in accordance with the invention.

A second alternative shore wave float system, particularly suited for a permanent shore line installation, is illustrated in the side view of FIG. 11 showing the bottom surface 100 in cross section. An open steel frame work, shown generally at 112, may be anchored in a concrete foundation 110 and has slanted member 114 sloping shoreward with respect to the incoming wave. Sloping members 114 act as tracks for float 120. Rollers 121 on either side of float 120, which may be a hollow drum shaped float, ride in tracks of members 114 and are secured by an outer rail 116. Float 120 is coupled to cable 8 by a yoke arrangement 123 and fed through pulley 122 to the shore. Breakers or shore waves 130 will contact float 120 forcing the float upward as shown by arrow J by virtue of the lateral component of force in the direction of the open faced arrow plus the vertical component due to the flotation effect of float 120. Thus, the energy contained in both the vertical increase in water level and the force tending to move the water shoreward is converted to translational motion of cable 8, as shown by arrow K, from an upward movement of float 120. The height of structure 112 and rail 114 may be a selected in accordance with anticipated breaker heights for high tide and thus will continue to operate at low tide with reduced amplitude of movement of cable 8.

As may now be seen, a practical relatively simple apparatus for converting ocean wave motion to useful work has been herein disclosed. The apparatus may be built in any desired size and many variations in construction will be apparent to those of ordinary skill in the art. Units may be built for portable and temporary use, or may be designed for permanent installation and therefore have capability of replacing more conventional sources of power. A small model unit having the general configuration as shown in FIG. 3 has been built and tested. When installed in the Atlantic Ocean on the east shores of Florida, using a steel float having approximately 15 cubic feet of volume, approximately two horsepower continous output power was developed.

Although various specific mechanical arrangements have been shown for exemplary purposes, many variations in the float design and in the energy storage and transfer elements may be made without departing from the spirit and scope of the invention.

I claim:

1. Apparatus for producing useful work from wave motion in a body of water comprising:

first transfer means for periodically transferring the energy in such wave motion to translational mechanical energy, said first transfer means comprising a cable and float means adapted to be anchored in the body of water, said float means connected to said cable for converting the wave motion into a reciprocating translational motion of said cable;

storage means for periodically storing such translational mechanical energy as potential torsional energy, said storage means comprising cable drum means connected to said cable for coiling and uncoiling said cable on said drum, said drum arranged to rotate in a forward direction in response to uncoiling of said cable when said translational motion is away from said drum means, said drum means having a recoil spring arranged to rotate said drum in a reverse direction to rewind said cable on said drum means when said translational motion is toward said drum means, first ratchet gear means connected to said cable drum means and adapted to rotate only when said cable drum is rotated in a forward direction, second ratchet gear means operatively engaged with said first ratchet gear means, and energy storage spring means connected to said second ratchet gear means, said energy storage spring means being wound only in response to rotation of said second ratchet gear means when said first ratchet gear means is rotated, and to thereby periodically store torsional energy originating from wave motion of said float means in said energy storage spring means;

second transfer means for transferring such potential torsional energy to continuous kinetic rotational energy available for producing useful work, said second transfer means comprising a shaft connected to said energy storage spring means and adapted to be rotated as said energy storage spring means unwinds, and an energy storage flywheel driven from said shaft for receiving the stored torsional energy from said energy storage spring means, said energy storage flywheel adapted to provide a continuous energy output; and means for producing useful work from such kinetic rotation energy.

2. The apparatus as defined in claim 1 in which said means for producing useful work is an electrical generation system coupled to said flywheel.

3. The apparatus as defined in claim 2 in which said electrical generation system comprises an electrical generator, a battery system, and a battery charging system powered by said generator and connected to said battery system.

4. The apparatus as defined in claim 1 which further comprises:

clutch means associated with said first ratchet means, said clutch means adapted to prevent said second ratchet gear means from rotation when said clutch means is disengaged;

governor means associated with said energy storage flywheel; and clutch control means connected to said clutch means and responsive to said flywheel governor means to disengage said clutch means when a selected amount of energy is stored in said energy storage flywheel.

5. Apparatus for producing useful work from wave motion in a body of water comprising:

a support structure adapted to be anchored to the bottom of said body of water;

a float associated with said structure and adapted to follow the wave motion of the water;

a cable connected to said float and communicating with the shore of said body of water, said cable arranged to follow a reciprocating translational motion relative to said shore in response to vertical motions of said float;

a cable drum anchored to said shore, said cable drum connected to the shore end of said cable and adapted to wind said cable on said drum when said translational motion is toward said shore, and to unwind when said translational motion is away from said shore;

a first gear coupled to said cable drum and adapted to rotate only when said cable is unwinding from said cable drum;

a second gear operatively coupled to said first gear and adapted to rotate only when said first gear is rotated;

a spiral spring connected to said second gear and adapted to be wound by rotation of said second gear;

a spring mounting plate having an output shaft, said spiral spring mounted on said plate with one end thereof anchored to said plate, said spring and said plate arranged to rotate said output shaft when said spring unwinds; and a flywheel coupled to said output shaft, said flywheel adapted to be rotated when said spring unwinds;

whereby energy from said wave motion is stored in said flywheel as kinetic energy and available therefrom to produce useful work.

6. The apparatus as defined in claim 5 which further comprises:

a clutch connected to couple said first gear to said cable drum and adapted to decouple said first gear from said cable drum when said clutch is released;

a governor connected to said flywheel; and a clutch control connected to said governor and to said clutch, said governor responsive to the rotational speed of said flywheel to cause said clutch control to engage said clutch when such rotational speed is less than a selected value and to disengage said clutch when such speed is greater than the selected value.

7. The apparatus as defined in claim 5 in which said support structure is a metal framework for supporting weighting blocks having a pulley attached thereto by means of a universal joint mounting, said cable being disposed essentially horizontally from said shore to said support structure and passed through said pulley and having its seaward end attached to said float;

whereby vertical movement of said float in response to said wave motion results in a reciprocating translational motion of the horizontal portion of the said cable.

8. The apparatus as defined in claim 5 in which said float comprises:

a pair of cylindrical drum-like float elements;

a connecting structure adapted to maintain said two cylindrical floats with their central axis parallel, said structure having a pivot point midway between said axis;

a lever arm having a first distal end pivoted to said pivot point, and a second opposite distal end connected to the seaward end of said cable; and a vertical support post having a base end attached to said support structure and having an upper distal end pivotally connected to said lever arm, said lever arm adapted to move said cable in said reciprocating translational motion when said floats move in response to shore waves in said body of water.

9. The apparatus as defined in claim 5 in which:

said support structure comprises a base anchored to said bottom and having an upright frame attached thereto, said frame having a sloping track assembly sloping shoreward, and a pulley attached to said frame adjacent to said base; and said float is constrained to move upward and downward along down said sloping track assembly, said cable from said shore passing through said pulley and thereafter having its seaward end attached to said float;

whereby shore waves cause said float to move upwardly and downwardly along said sloping track assembly to thereby cause said cable to move in said reciprocating translational motion.

* * * * *